(12) United States Patent
Anfindsen et al.

(10) Patent No.: US 7,209,801 B2
(45) Date of Patent: Apr. 24, 2007

(54) METHOD AND A SYSTEM FOR PROGRAMMING AN INDUSTRIAL ROBOT

(75) Inventors: Ole Arnt Anfindsen, Sandnes (NO); Charlotte Skourup, Drammen (NO); Thomas Pettersen, Oslo (NO); John Pretlove, Sandvika (NO)

(73) Assignee: ABB Research Ltd, Zürich (CH)

( * ) Notice: Subject to any disclaimer, the term of this patent is extended or adjusted under 35 U.S.C. 154(b) by 247 days.

(21) Appl. No.: 10/743,316

(22) Filed: Dec. 23, 2003

(65) Prior Publication Data

US 2004/0193321 A1 Sep. 30, 2004

(30) Foreign Application Priority Data

Dec. 30, 2002 (SE) .................................... 0203907

(51) Int. Cl.
*G06F 19/00* (2006.01)

(52) U.S. Cl. .................. 700/245; 700/259; 700/264; 318/568.2

(58) Field of Classification Search ................ 700/245, 700/259, 264; 318/568.2
See application file for complete search history.

(56) References Cited

U.S. PATENT DOCUMENTS

| | | | |
|---|---|---|---|
| 4,482,968 A | 11/1984 | Inaba et al. | |
| 4,523,287 A | 6/1985 | Kogawa | |
| 4,945,493 A * | 7/1990 | Huang et al. ............... | 700/251 |
| 5,184,051 A | 2/1993 | Schweiker et al. | |
| 5,276,777 A | 1/1994 | Hara | |
| 5,327,058 A | 7/1994 | Rembutsu | |
| 5,845,053 A | 12/1998 | Watanabe et al. | |
| 5,949,683 A | 9/1999 | Akami et al. | |
| 6,535,793 B2 * | 3/2003 | Allard ........................ | 700/259 |
| 6,845,297 B2 * | 1/2005 | Allard ........................ | 700/259 |
| 7,079,924 B2 * | 7/2006 | Galbraith .................... | 700/245 |
| 2004/0189675 A1 * | 9/2004 | Pretlove et al. ............. | 345/633 |
| 2005/0149231 A1 * | 7/2005 | Pretlove et al. ............. | 700/264 |
| 2005/0251290 A1 * | 11/2005 | Skourup et al. ............ | 700/245 |
| 2005/0256611 A1 * | 11/2005 | Pretlove et al. ............. | 700/264 |

(Continued)

FOREIGN PATENT DOCUMENTS

| | | |
|---|---|---|
| DE | 19626459 | 1/1998 |
| EP | 0 414 919 A1 | 3/1991 |
| EP | 0414919 | 3/1991 |
| EP | 0 780 197 A1 | 6/1997 |
| EP | 0780197 A1 | 6/1997 |

OTHER PUBLICATIONS

Veyha et al., Method and system for robot end effector path correction using 3-D ultrasound sensors, 2000, IEEE, p. 1240-1243.*

(Continued)

*Primary Examiner*—Thomas Black
*Assistant Examiner*—McDienel Marc
(74) *Attorney, Agent, or Firm*—Venable LLP; Eric J. Franklin

(57) ABSTRACT

A method for programming an industrial robot having a tool. The method includes obtaining configuration data for the tool and for the robot path and information about the position and orientation of the object in relation to the robot, obtaining a sequence of waypoints, which defines the process in relation to the object, obtaining at least one distance for adjusting the position of a waypoint, deciding whether an obtained waypoint should be modified or not, based on the obtained information about the waypoints, generating a modified sequence of waypoints by modifying the waypoints in the obtained sequence of waypoints, based on the decision, the obtained distance and the obtained information about the waypoints and generating the actual robot path based on the modified sequence of waypoints and the obtained configuration data.

17 Claims, 5 Drawing Sheets

OTHER PUBLICATIONS

Vaughan et al., Exploiting task regularities to transform between reference frames in robot teams, 2002, IEEE, p. 2599-2605.*

Dixon et al., Predictive robot programming, 2002, IEEE, p. 876-881.*

Vaughan et al., LOST: Localization-space trails for robot teams, 2002, IEEE, p. 796-812.*

Search Report issued in European patent application 03079136.2.

* cited by examiner

METHOD AND A SYSTEM FOR PROGRAMMING AN INDUSTRIAL ROBOT

CROSS-REFERENCE TO RELATED APPLICATIONS

This application claims priority to Swedish patent application 0203907-1 filed 30 Dec. 2002.

FIELD OF THE INVENTION

The present invention relates to a method for programming an industrial robot having a tool, to perform a process on an object while following a robot path defined by a number of waypoints. The process could be any type of surface processing application carried out by an industrial robot, such as painting, glazing, sanding, polishing, grinding, and welding. The invention is particularly suitable for use in connection with teaching the robot a paint application.

The present invention also relates to a computer program product directly loadable into the internal memory of a computer, comprising software code portions for performing the steps of the method according to the invention, when said product is run on a computer.

The present invention also relates to a computer readable medium having a program recorded thereon, where the program is to make a computer perform the steps of the method according to the invention when said program is run on the computer.

The present invention further relates to a system for use in connection with programming of an industrial robot, the system comprising information obtaining means, obtaining information about configuration data, tool speeds and a sequence of waypoints comprising information about desired positions of the tool in relation to the object and desired positions of process events in relation to the object and a storage unit, for storing the obtained information.

PRIOR ART

Robots are often used for processing the surface of an object. Existing practice for programming a robot involves teaching the robot a sequence of waypoints. The waypoints define the path, which the robot shall follow during the processing of the object. A waypoint comprises three-dimensional position and three-dimensional orientation information. The robot is taught how to perform the task by being guided through the various waypoints along the desired operating path during the programming. The waypoints are specified in a first iteration and process related information, such as brush type and paint color, is added to the waypoint in a second iteration. The robot program is then generated, based on the specified waypoints and the process information. The robot program is stored in a memory in the robot control unit. Then, the robot program is executed, and, if necessary, optimized after the robot has performed the operations. This programming method is described in the patent document U.S. Pat. No. 5,327,058.

Generally, the robot is programmed to perform a task by an human operator who manually jogs the robot to the desired positions along the path using a movable programming unit, a so-called teach pendant. Commonly used programming methods using a teach pendant is described in the patent document U.S. Pat. No. 5,327,058. An industrial robot usually carries an end-effector comprising a tool for performing the processing, for instance a welding tool or a painting tool. During programming of the path, the operator has to position and orient the end-effector in each waypoint along the path. Teach-by show methods have the advantage of indirectly utilizing implicit process knowledge of the operator during the programming. A disadvantage with traditional manual teaching methods is that the control of the process often is difficult to optimize. This is due to the fact that the operator does not get any feedback information before the robot program is executed.

Alternatively, if a 3D CAD model of the object exists, a person with a computer scientist background teaches the waypoints in a robot simulation system, so-called off-line programming. The CAD approach is costly and not always intuitive to use. The complexity of the CAD-system requires the operator who is programming the robot to have knowledge about computer science. Such a person usually has little or no knowledge about the process. Either way, the teaching process is time consuming, troublesome, error prone, and in almost all cases requires several iterations before the program is acceptable.

All traditional methods for programming an industrial robot are focused on indicating the exact robot path in relation to the real object. The operator teaches the exact robot path and process events on this path instead of concentrating on the object.

SUMMARY OF THE INVENTION

The object of the present invention is to provide an improved industrial robot programming solution that is easy and intuitive to use and that reducing the teaching time for the teaching process.

According to one aspect of the invention, the object is achieved by means of the initially defined method, comprising: obtaining configuration data including configuration data for the tool, configuration data for the robot path and information about the position and orientation of the object in relation to the robot, obtaining a sequence of waypoints, which defines the process in relation to the object, the waypoints comprises information about desired positions of the tool in relation to the object and desired positions of process events in relation to the object, obtaining at least one distance for adjusting the position of a waypoint, automatically deciding whether an obtained waypoint should be modified or not, based on the obtained information about the waypoints, automatically generating a modified sequence of waypoints by modifying the waypoints in the obtained sequence of waypoints, based on said decision, the obtained distance and the obtained information about the waypoints, and automatically generating the actual robot path based on the modified sequence of waypoints, and the obtained configuration data.

By means of at least one computer, the complete robot path is automatically generated based on the operator's input. The operator teaches waypoints representing, positions, orientations and events in direct relation to the object. The operator inputs the waypoints in the specific order these will occur in the robot program. The operator only have to work with inputs directly at the surface of the object, unlike today's programming methods where the operator has to record the complete robot path that also exists outside of the object surface. The operator does not need to consider the real robot path, i.e. how long a distance out from the surface the robot needs to start the path or switch on the process. Thus, the programming becomes more intuitive and focused on the process and the object, instead of the robot path.

Furthermore, the method reduces the total programming time, since less iterations is needed to achieve the robot path. The method according to the invention is suitable for off-line programming of the robot.

According to an embodiment of the invention, the step obtaining the sequence of waypoints further comprises obtaining information about the position of a pointing member pointing at points on or in the vicinity of the object, storing the point being presently pointed out by the pointing member as a waypoint upon receiving a recording signal, obtaining information about a process event, storing the information about the process event together with the position of the waypoint, and determining the position of the points in relation to the object based upon said obtained information. By using a pointing member and pointing on the surface of the object, the operator will be able to teach the robot path in a single iteration and in the same way as he would use a tool, for example a paint-gun or a brush, and manually process the object surface. The total programming time is reduced, due to the fact that it is possible to teach the waypoints in a single iteration.

According to an embodiment of the invention, said modifying of waypoints is made based on a set of pre-defined rules. When generating the robot path for a certain process, several precautions must be taken during the programming procedure. To assure that these precautions are taken, the waypoints are modified based on a set of pre-defined rules.

According to an embodiment of the invention, the decision comprises determining whether a waypoint comprises a specific process event and deciding that the waypoint should be modified if it does comprise the specific process event. Generally, a waypoint should not be modified, if it does not include a process event. Only points including specific process events should be modified. For instance, if the waypoint comprises the process event "turn on the process" or "turn off the process", the waypoint should be modified.

An issue to be regarded in connection with painting is that when a paint stroke is to be started, the paint must be turned on some distance before the actual paint stroke is specified. This is necessary due to the fact that there is a time delay from the paint-on command occurs until the paint hits the target and that the paint gun has a velocity vector in the direction of the paint stroke. In the same way, the paint needs to be turned off at a distance before the specified endpoint of the paint stroke. Again, due to the fact that the paint gun has a velocity vector in the direction of the paint stroke, and that there is a delay time from the "paint off" command occurs until the application of paint ceases.

Another issue to be regarded is that, in order to assure a high quality of the painting, the paint gun needs to have a velocity vector that is constant through the whole paint stroke. In order to accomplish this, the paint gun needs to be accelerated up to the desired speed in a correct direction before the paint is turned on and then the paint gun keeps the speed until the end of the paint stroke where the paint is turned off. Thereafter the paint gun needs to continue in the same direction for a distance while retarding. Normally, the operator solves this issue by specifying a point prior to where the paint is to be applied, in the direction of the paint stroke, so that the paint gun can reach the desired speed at the point where the paint starts to be applied.

An advantage with the method according to the invention is that the operator does not need to bother about the issues mentioned above; he only needs to specify the positions on the object where the process should start and stop.

According to an embodiment of the invention, the distance obtained for adjusting the position of a waypoint is a point extension distance that depends on the tool speed. The point extension distance is the distance an obtained waypoint should be moved to assure that the tool is accelerated up to the desired speed before the process starts and the distance the tool needs to retard after the process has been turned off. The point extension distance is either fed to the system by the operator or calculated by the system based on the obtained tool speed. In both cases, the point extension distance depends on the desired tool speed in the waypoints.

According to an embodiment of the invention, the modifying of a waypoint comprises adding a new waypoint to the sequence of waypoints and determining a position for the new waypoint based on said point extension distance and the obtained waypoints. Preferably, the determining of the new position for the waypoint comprises determining a direction based on the position of the current waypoint and the position of the previous waypoint, or the position of the current waypoint and the next waypoint, depending on the process event, and obtaining the new position by adding the point extension distance to the position of the obtained waypoint in the determined direction.

For instance, if the operator has specified a waypoint at which the paint should be turned on, i.e. the waypoint comprises a position and the process event "turn on the process", a new waypoint has to be added before the specified waypoint, to assure that the paint gun should have accelerated up to the desired speed in the specified waypoint. The new waypoint is positioned backwards in the direction of a path described by the current, and the next waypoint at a distance equal to the point extension distance. If the process event is "turn off the process", the new waypoint is positioned forwards in the direction of a path described by the previous and the current specified waypoints, at a distance equal to the point extension distance.

According to an embodiment of the invention, the obtaining of a distance for adjusting the position of the waypoint comprises obtaining an event extension distance that depends on the tool speed and a delay time in connection with the process event. The event extension distance may either be provided by the operator or calculated by the system based on the tool speed and the delay time. The modifying of a waypoint comprises determining a new position for the process event based on said event extension distance and the obtained waypoints, and moving the process event to the new position. For instance, if the operator specifies a waypoint with a position, at which the paint should start to be applied and the paint were turned on exactly at the specified position, the paint would start to be applied at a distance after the specified position due to the paint gun speed and the delay of the paint. Thus, a process event should not always happen exactly at the specified waypoint due to tool speed and process delay. Accordingly, the position of the specified waypoint has to be modified. The exact position, where the event should occur, is automatically calculated by the system and the specified waypoint is moved to that position.

According to an embodiment of the invention, the determining of the new position for the process event comprises determining a direction based on the position of the current waypoint and the position of the previous waypoint, or the position of the current waypoint and the next waypoint depending on the process event, and obtaining the new position by adding the event extension distance to the position of the obtained waypoint in the determined direction. If a waypoint should be moved forward in a direction described by the previous and the current waypoints or backwards in a direction described by the current and the next waypoint depends on the process event. The distance that the point should be moved is equal to the point extension distance.

According to an embodiment of the invention, robot program codes are automatically generated based on the generated robot path.

Preferably, the waypoints also comprise information about the orientation of the tool. According to an embodiment of the invention, the method comprises copying the orientation of the last waypoint to the obtained waypoint upon request. When painting an object, going from waypoint to waypoint, it is often required to have the same orientation of the paint gun. It is therefore advantageous to be able to copy the orientation of the last valid waypoint to the current waypoint specified.

According to an embodiment of the invention, the method comprises storing the obtained waypoint in a first waypoint list and storing the modified sequence of waypoints in a second waypoint list. This is done in order to remember the points specified by the operator in case the operator at a later occation wants to delete, change, or add a new waypoint. If the operator wants to edit a waypoint afterward, at least parts of the robot path has to be generated again, and the waypoints have to be modified again based on said set of pre-defined rules.

According to a further aspect of the invention, the object is achieved by a computer program product directly loadable into the internal memory of a computer, comprising software code portions for performing the steps of the method according to the invention, when said product is run on a computer. The computer program product is provided either on a computer readable medium or through a network such as the Internet.

According to another aspect of the invention, the object is achieved by a computer readable medium having a program recorded thereon, where the program is to make a computer perform the steps of the method according to the invention, when said program is run on the computer.

According to still another aspect of the invention, the object is achieved by the initially defined system characterized in that it comprises means for deciding whether an obtained waypoint should be modified or not, based on the obtained information about the waypoints, means for generating a modified sequence of waypoints by modifying the waypoints in the obtained sequence of waypoints, based on said decision, a distance for adjusting the position of a waypoint and the obtained information about the waypoints, and a robot path generator, generating the actual robot path based on the modified sequence of waypoints, the tool speed and the obtained configuration data.

BRIEF DESCRIPTION OF THE DRAWINGS

The invention will now be explained more closely by the description of different embodiments thereof and with reference to the appended figures.

DETAILED DESCRIPTION OF PREFERRED EMBODIMENTS OF THE INVENTION

Figure 1:
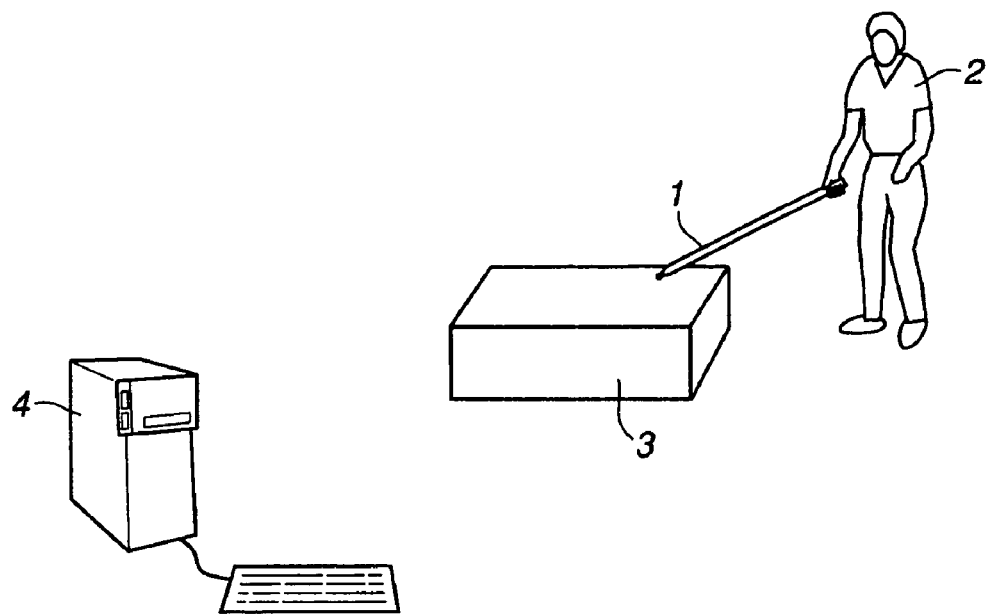
FIG. 1 shows an operator teaching a sequence of waypoints on an object using a pointing member.

FIG. 1 shows an example of system for use in connection with programming of an industrial robot according to the present invention. The system comprises a pointing member 1 utilized by a human operator 2 for off-line teaching the robot how to process an object 3. The pointing member can either be the processing tool itself, or preferably a device particularly adapted for the purpose of teaching the processing of the object. The pointing member could, for example, be a pen shaped device or an imitation of the processing tool, such as a paint-gun or a paintbrush.

The operator holds the pointing member 1 in his hand and points at the point he wants to include in the path and orientates the pointing member as he wishes the processing tool to be oriented in the point. The operator records a point by activation of an activation member, which generates a recording signal. Upon receiving the recording signal the system stores the point as a waypoint. The position and orientation of the pointing member is for example determined the by means of image recognition. Alternatively, the pointing device may generate positions and orientations in a number of different ways. For example, the pointing member can be a mechanical digitizer arm providing the position and orientation of its tip or the pointing member may include a sensor for determining position and orientation. Examples of sensors and technologies for determining positions and orientations are accelerometers, gyros, magnetic trackers, ultrasound, laser technology, vision-based tracking systems, and the Global Positioning System (GPS).

The pointing member 1 comprises interaction means adapted for interaction between the operator and the system. One of the interaction means generates upon activation a recording signal for recording the point as a waypoint. Another interaction means is used for indicating whether the processing should be on or off between the waypoints. For example, if the process is painting, the interaction means indicates whether the paint is on or off. The system is also provided with means for input of information related to the process to the system such as brush type and color type. Alternatively, the processing can be defined as "on" or "off" depending on the process information. While teaching the robot, the operator records waypoints on the surface of the object and he also records process related information in connection with the waypoints. In relation to each recorded waypoint, the operator indicates whether the processing should be on or off.

Information about position and orientation of the pointing member 1, and process data is transferred to a computer 4 including a processor and a memory. The output from the interaction means is either transferred via a wire or wirelessly from the pointing member 1 to the computer 4. The processor of the computer 4 is utilized for running algorithms generating the robot path according to the invention and the memory is utilized for storing the obtained waypoints and the program instructions of the algorithms.

The teaching comprises teaching the robot how to perform the process by specifying a number of waypoints given in a specific sequence, describing the process in relation to the object. For instance the waypoints describe paint strokes on the surface of the object. The operator teaches the waypoints in a specific order related to the object surface.

This order is relevant for the automatic generation of the robot path. A waypoint comprises desired position and orientation of the processing tool in the point, and data related to the process. The waypoint comprises either the recorded position and orientation, or the recorded position and a copy of the last recorded orientation. When the operator teaches the path he first specifies a starting point for the robot path. The starting point is positioned at a distance from the object. Then the operator starts to specify points on the surface of the object.

The operator may specify at least three points on or in the close vicinity of the object, specifying a plane. Waypoints laying on this plane may automatically receive orientation data in a preconfigured angle related to this plane and the programmed tool velocity vector.

When the operator specifies a robot path, he positions the pointing member to the desired waypoint and the position and the orientation of the pointing member is calculated related to the object coordinate frame. The operator uses the activation member to set the desired brush type. The operator uses one of the activation members to specify that the desired point is to be stored in a waypoint list. In this embodiment, there are two possibilities: if the button is pushed for a long period of time, both position and orientation are recorded. If the button is pushed and released immediately, only the position is recorded. The orientation will then be copied from the last valid orientation in the list of waypoints.

Before the programming can start, certain configuration data need to be specified in the system. These configuration data will enable the system to calculate the real robot waypoints based upon the user specified waypoints. Either the operator feeds the configuration data to the system or some of the configuration data are previously stored into the system. The configuration data include a definition of the robot tool, a definition of the object coordinate system in relation to the robot co-ordinate frame, configuration data for the robot path, tool speeds and other relevant data. The definition of the robot tool comprises a definition of the tool center point (TCP) and for example a list of available brush types with associated paint color. Typically, a brush type consists of paint flow and airflow parameters. The brush types are stored in an index brush table. One or several brush types can be defined as "process off", typically meaning that the paint flow is zero.

The configuration data for the robot path includes a transport zone and a paint zone. A transport zone is the size of an arch combining two line segments of the path when the process is "off". A paint zone is the size of an arch combining two line segments when the process is "on". The operator also has to feed information about desired tool speeds to the system. The tool speeds includes a transport speed, which is the tool speed of the tool when the process is "off", and a process speed, which is the tool speed when the process in "on".

For the modification of the waypoints a point extension distance and an event extension distance is needed. The point extension distance is a distance for extension of waypoints before and after the process has been turned on or off. The size of the point extension distance is estimated in order to achieve an acceleration of the tool up to the desired tool speed before the process is turned on or to retard the tool after the process has been turned off. The event extension distance is a distance for extension of an event due to the tool velocity and a delay time from the time when the tool is turned on or off until the process starts or stops. In this embodiment, the operator feeds the point extension distance and the event extension distance to the system. In another embodiment the system calculates the point and event extension distances, based on the specified tool speeds and one or more delay times fed to the system.

Alternatively, some of the configuration data can also be entered at each waypoint that the operator specifies. This will enable the operator to adjust parameters, such as paint speed, transport speed, paint zone, and transport zone for specific waypoints during the programming.

Figure 2:
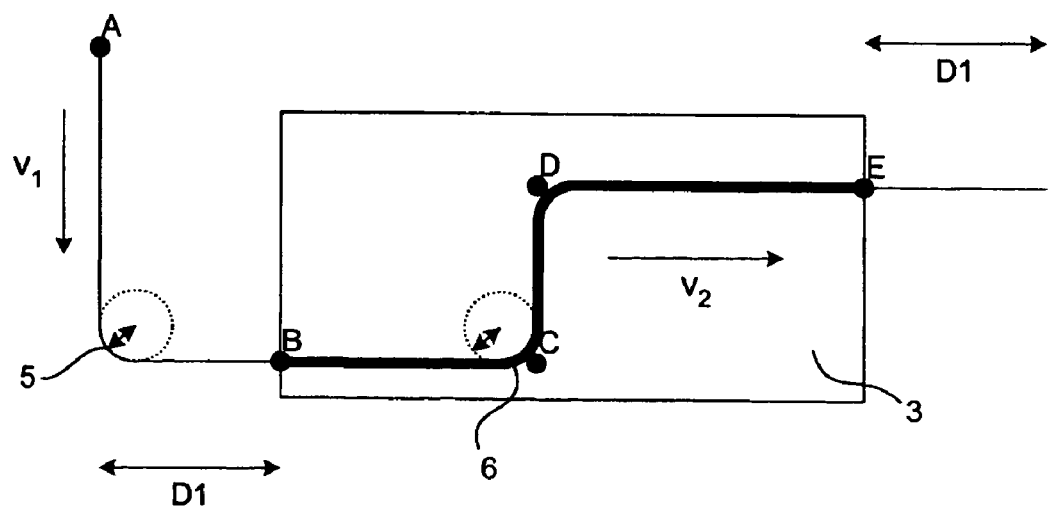
FIG. 2 is an illustration of a robot path and configuration data obtained in connection with the path.

FIG. 2 illustrates the configuration data in relation to the robot path. Waypoints A, B, C, D, E are specified by the operator. Point A is the starting point and the process is "off" in this point. At waypoint B, the process is turned on. Waypoints C and D are specified with the same process data, such as the same brush type and the same color. At waypoint E, the process is turned off. Since the process is turned off between point A and B, the speed between those points is the transport speed $v_1$, with speed $v_2$ specified to the robot controller form the arc 5, in order for the robot tool to reach the desired speed $v_2$ at point B. Since the process is turned on between the waypoints B and E the tool speed between those points is the process speed $v_2$. When generating a robot path, the generated path should not only consist of straight lines between the waypoints. When a path changes its direction in a waypoint the tool shall follow an arch 5, 6 in order to maintain the specified tool speed. The size of an arch depends on if the process is on or off. The process zone is the size of the arch 5 when the process is off. The transport zone is the size the arch 6 when process is on. The point extension distance D1 is the distance that a waypoint should be extended before and after the process has been turned on or off, so that the tool is accelerated or retarded to the desired speed and in the correct direction before the process is turned on and after the process is turned off.

Figure 3:
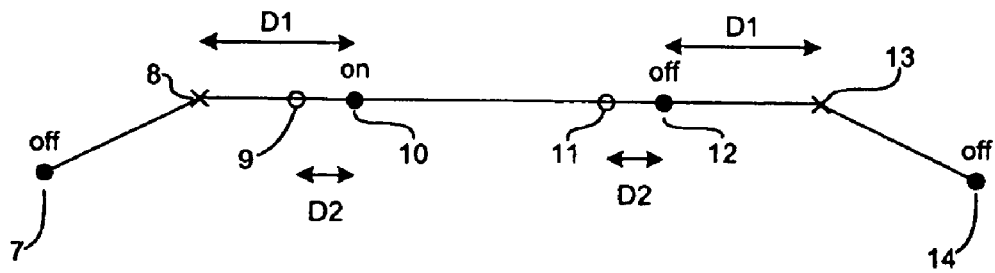
FIG. 3 shows an example of a sequence of waypoints modified by a method according to the invention.

The actual robot waypoints will be generated based upon the configuration data and the obtained sequence of waypoints according to a set of rules described below. More specifically, a new modified sequence of waypoints are calculated based upon the previously, the current and the next specified waypoint. The method assumes that there exists a starting point with the process turned off and its position and orientation specified. FIG. 3 illustrates the actions taken by the system to modify the operator specified waypoints. Black dots illustrate waypoints 7, 10, 12, 14 specified by the operator. White dots illustrate waypoints 9, 11 with positions modified by the system. Crosses 8, 13 illustrate new waypoints added by the system.

The waypoints 7, 10, 12, 14 specified by the operator are stored in a separate waypoint list (w. p. l.). This is done in order to memorize user specified points in case the operator at a later time wants to delete, edit, or add new waypoints. In some cases, a waypoint cannot be modified directly because its new position is dependent on the following waypoint. If this is the case, the point is stored in a wait-list (w. l.). Waypoints 7, 8, 9, 11, 13, 14 to be used for generation of the robot path are stored in a path list (p. l.).

In the following, the point generation rules will be described with reference to FIG. 3. Upon receiving, a waypoint specified by the operator is always stored in the waypoint list. Each recorded waypoint comprises information about whether the process, between the waypoint and the next waypoint, should be on or off. If the operator specifies a waypoint 14 with "process off" and the last specified waypoint 12 is also specified with "process off", the waypoint is stored without any modifications to the path list. If the operator specifies a waypoint 10 with "process on" and the previous waypoint 7 was specified with "process off", a new waypoint 8 is added to the path list. The new waypoint 8 is position backwards, in a direction described by the current waypoint 10 and the next waypoint 12, at a distance equal to the point extension distance D1 previously obtained. The new waypoint 8 is stored in the path list. The waypoint 10 represents the event "turn on process". In order to accomplish that the process starts in the specified waypoint, the position of the waypoint 10 has to be moved. The waypoint is moved backwards in a direction that is determined by the current waypoint 10 and the next waypoint 12, to compensate for the tool velocity and the delay time in connection with turning on the process. The waypoint 12 is moved a distance equal to the event extension distance D2. An event "turn on process" is generated in connection with the modified waypoint. The modified waypoint 9 is stored in the path list.

If the operator specifies a waypoint 12 with "process off" and the previous waypoint 10 is specified with "process on", a new waypoint 13 is added to the path list. The new waypoint 13 is position forwards, in a direction described by the previous waypoint 10 and the current waypoint 12, at a distance equal to the point extension distance D1. The waypoint 12 represents the event "turn off process". In order to accomplish that the process stops in the specified waypoint, the position of the waypoint 12 has to be moved. The waypoint is moved backwards in a direction that is determined by the previous waypoint 10 and the current waypoint 12, to compensate for the tool velocity and the delay time in connection with turning off the process. The waypoint 12 is moved a distance equal to the event extension distance D2. An event "turn off process" is generated in connection with the modified waypoint. The modified waypoint 11 is stored in the path list. If the operator specifies a waypoint with process on and the previous waypoint was also specified with brush on, the obtained waypoint is stored without modifications in the path list.

If the delay time is small, it is not necessary to compensate for it. In the following example the waypoints are not modified due to delay times in connection with turning the process on or off. Waypoint representing events are then stored in the path list at their originally obtained positions.

Figure 4:
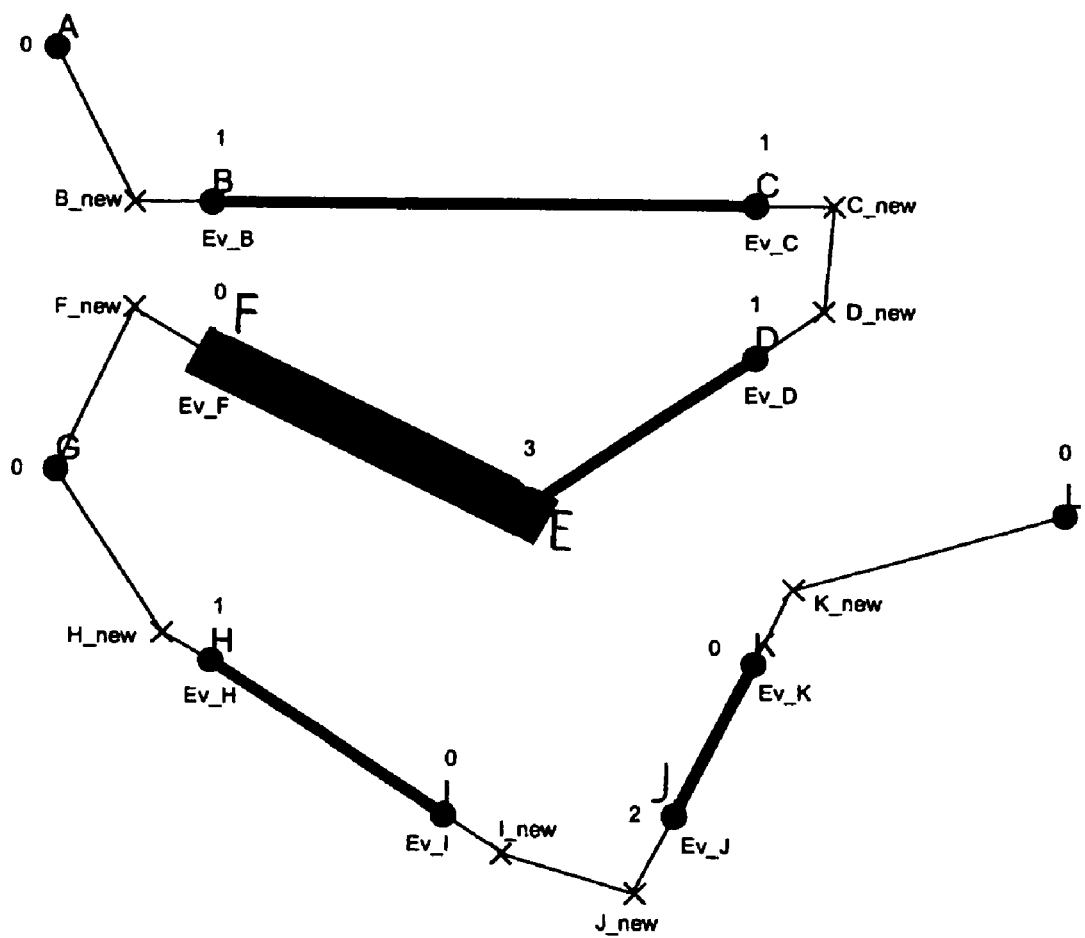
FIG. 4 shows another example of a sequence of waypoints modified by a method according to the invention.

FIG. 4 shows an example of how points are added and modified according to described rules for a paint application. Black dots represent operator specified waypoints A–L. Crosses illustrate new waypoints B_new–K_new added by the system. Numbers at the waypoints represent selected brush numbers. Brush number "0" is defined as "off". Brush number "1", "2", and "3" are defined as "on". Paint-strokes are shown where paint is specified to be on, and the width of the paint-stroke shown depends on the specified width of the brush. The actions taken by the system and the result of the actions are described in the following table:

| Specified waypoint | Current waypoint | Action | Result |
|---|---|---|---|
| A | First specified point, brush is "off" | Point A is stored in p. l. with brush number "0" | p. l. = [A]<br>w. l. = []<br>w. p. l = [A] |
| B | Waypoint is specified with a paintbrush "on" selected | Point B is stored in w. l. with brush number "1" | p. l. = [A]<br>w. l. = [B]<br>w. p. l = [A B] |
| C | Waypoint is specified with brush off | Adjust point in w. l. backwards along vector BC by distance "point extension". Store new point, B_new, in p. l. Create event Ev_B, store in p. l. Create event Ev_C, store in p. l. Adjust point C forwards along vector BC by distance "point extension" Store new point C_new in p. l. Clear value in w. l. | p. l. = [A B_new Ev_B Ev_C C_new]<br>w. l. = []<br>w. p. l = [A B C] |
| D | Waypoint is specified with brush on | Store point in w. l. | p. l. = [A B_new Ev_B Ev_C C_new]<br>w. l. = [D]<br>w. p. l = [A B C D] |
| E | Waypoint is specified with brush on, brush type changed (fan size and color changed) | Adjust point in w. l. backwards along vector DE by distance "point extension". Store new point D_new in p. l. Generate event Ev_D, store in p. l. Store E in p. l. Clear w. l. | p. l. = [ . . . C_new D_new Ev_D E]<br>w. l. = []<br>w. p. l = [A B C D E] |
| F | Waypoint is specified with | Generate event Ev_F, store in p. l. | p. l. = [ . . . Ev_D E Ev_F F_new] |

-continued

| Specified waypoint | Current waypoint | Action | Result |
|---|---|---|---|
| | brush off. | Adjust point F forward along vector EF by distance "point extension". Store new point F_new in p. l. | w. l. = [] w. p. l = [A B C D E F] |
| G | Waypoint is specified with brush off. | Store point in p. l. | p. l. = [ . . . Ev_D E Ev_F F_new G] w. l. = [] w. p. l = [A B C D E F G] |
| H | Waypoint is specified with brush on | Store point in w. l. | p. l. = [ . . . Ev_D E Ev_F F_new G] w. l. = [H] w. p. l = [A B C D E F G H] |
| I | Waypoint is specified with brush off | Adjust point in w. l. backwards along vector HI by distance "point extension". Store new point, H_new, in p. l. Create event Ev_H, store in p. l. Create event Ev_I, store in p. l. Adjust point I forwards along vector HI by distance "point extension" Store new point I_new in p. l. Clear value in w. l. | p. l. = [ . . . G H_new Ev_H Ev_I I_new] w. l. = [] w. p. l = [A B C D E F G H I] |
| J | Waypoint is specified with brush on, brush type changed (color changed) | Store point in w. l. | p. l. = [ . . . G H_new Ev_H Ev_I I_new] w. l. = [J] w. p. l = [A B C D E F G H I J] |
| K | Waypoint is specified with brush off | Adjust point in w. l. backwards along vector JK by distance "point extension". Store new point, J_new, in p. l. Create event Ev_J, store in p. l. Create event Ev_K, store in p. l. Adjust point K forwards along vector JK by distance "point extension" Store new point K_new in p. l. Clear value in w. l. | p. l. = [ . . . I_new J_new Ev_J Ev_K K_new] w. l. = [] w. p. l = [A B C D E F G H I L K] |
| L | Waypoint is specified with brush off | Store point in p. l. | p. l. = [ . . . Ev_J Ev_K K_new L] w. l. = [] w. p. l = [A B C D E F G H I J K L] |

When all the waypoints have been obtained and the waypoints have been modified, the actual robot path is generated based on the modified sequence of waypoints stored in the path list and the obtained configuration data e.g. transport speed, paint speed, transport zone, paint zone, and brush list. The robot path generation generates robot code comprising robot instructions for the movement of the robot. The path comprises a number of waypoints having position, orientation, and process data, as well as a number of waypoints representing specific process events. Each waypoint in the path list has a brush number associated with it.

A robot code generator takes the waypoints in the path list and the configuration data as an input and generates a robot program with the right syntax for the specific robot controller. The robot code generator can be any robot-code generator known to those skilled in the art. The tasks of the robot program generator are; locating the waypoints at the right places based on the process and the transport zones specified, generating the right syntax, and translating the input to the robot to a programming language. The generated robot code is either downloaded to the robot controller so that the robot can execute the program or integrated into a larger robot program as a module, in case the robot program contains a sequence of different objects.

In the following, it is described how the robot code is generated based on the waypoints in the path list. A proper "move" instruction implies a liner movement to a specified point with the tool in the specified orientation. The proper instruction is generated based upon the current process information. Before the code generation begins, default process parameters are read to the system and all positions and orientations specified in the path list are transformed from the object coordinate system to the robot coordinate system. Thereafter, a move instruction is generated to the first point in the path list with default process parameters. A move instruction to the next point in the path list is generated with the process information specified in the first point. This last step is repeated for all the points in the path list until the end of the path list. Below is an example of program code generated for waypoint A–G shown in FIG. 4.

EXAMPLE p. l.=[A, B_new, Ev_B, Ev_C, C_new, D_new, Ev_D, E, Ev_F, F_new, G]
  move to A, default process parameter
  move to B_new
  move to C_new with events in Ev_B and Ev_C
  move to D_new
  move to E with event in Ev_D
  move to F_new with event in Ev_F
  move to G.

Figure 5:
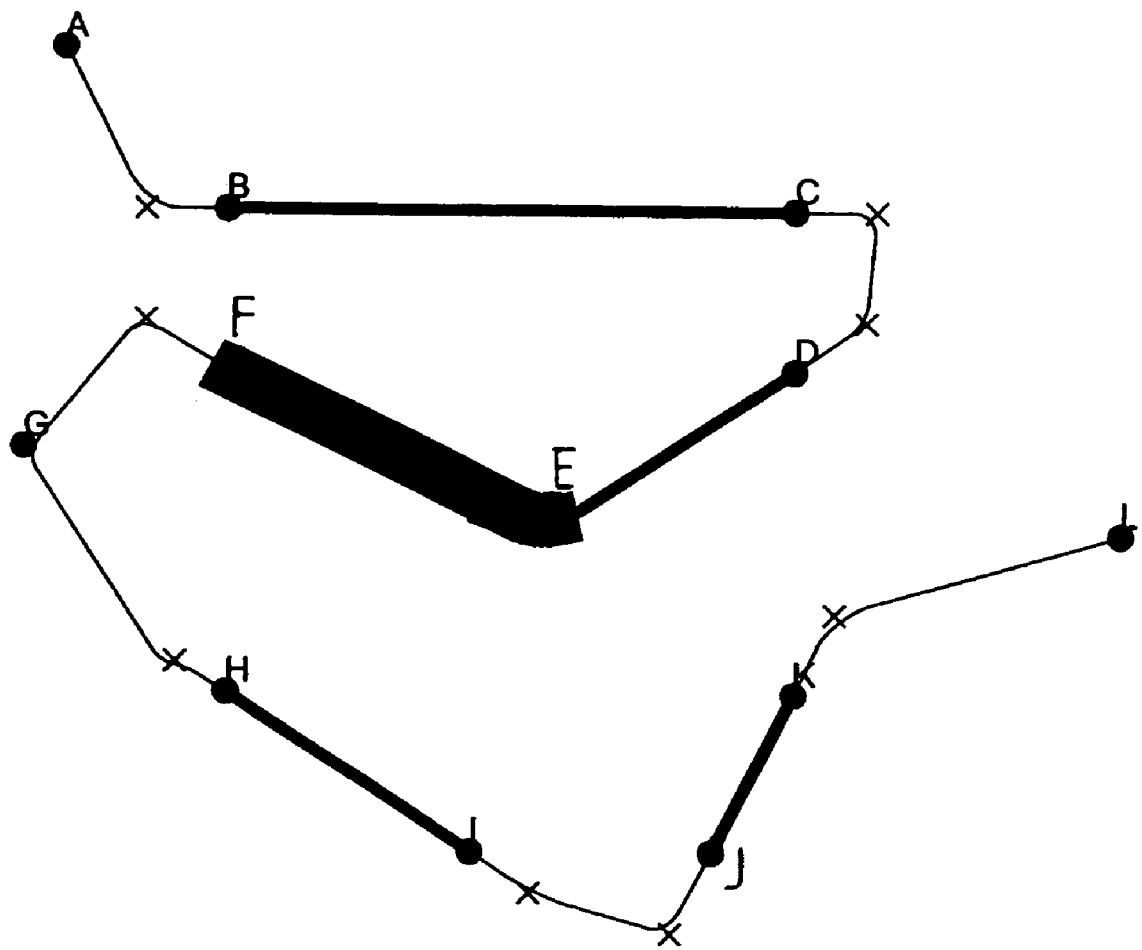
FIG. 5 shows a robot path generated based on the modified sequence of waypoints shown in FIG. 4.

The robot code generated is the input to the robot controller. FIG. 5 shows the actual robot path generated based on the generated robot instructions.

Figure 6:
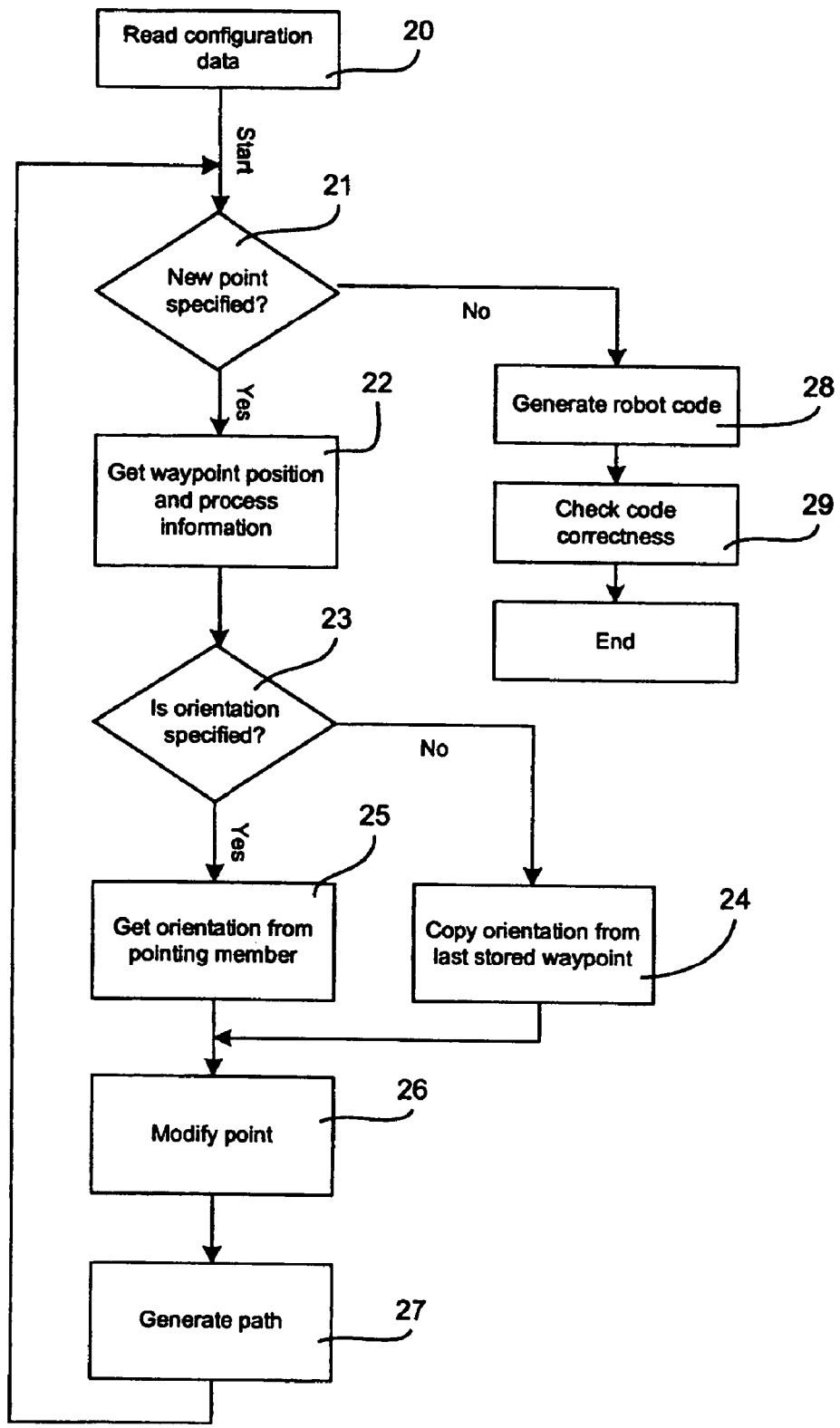
FIGS. 6 and 7 show flow charts of an embodiment of the method according to the invention.
Figure 7:
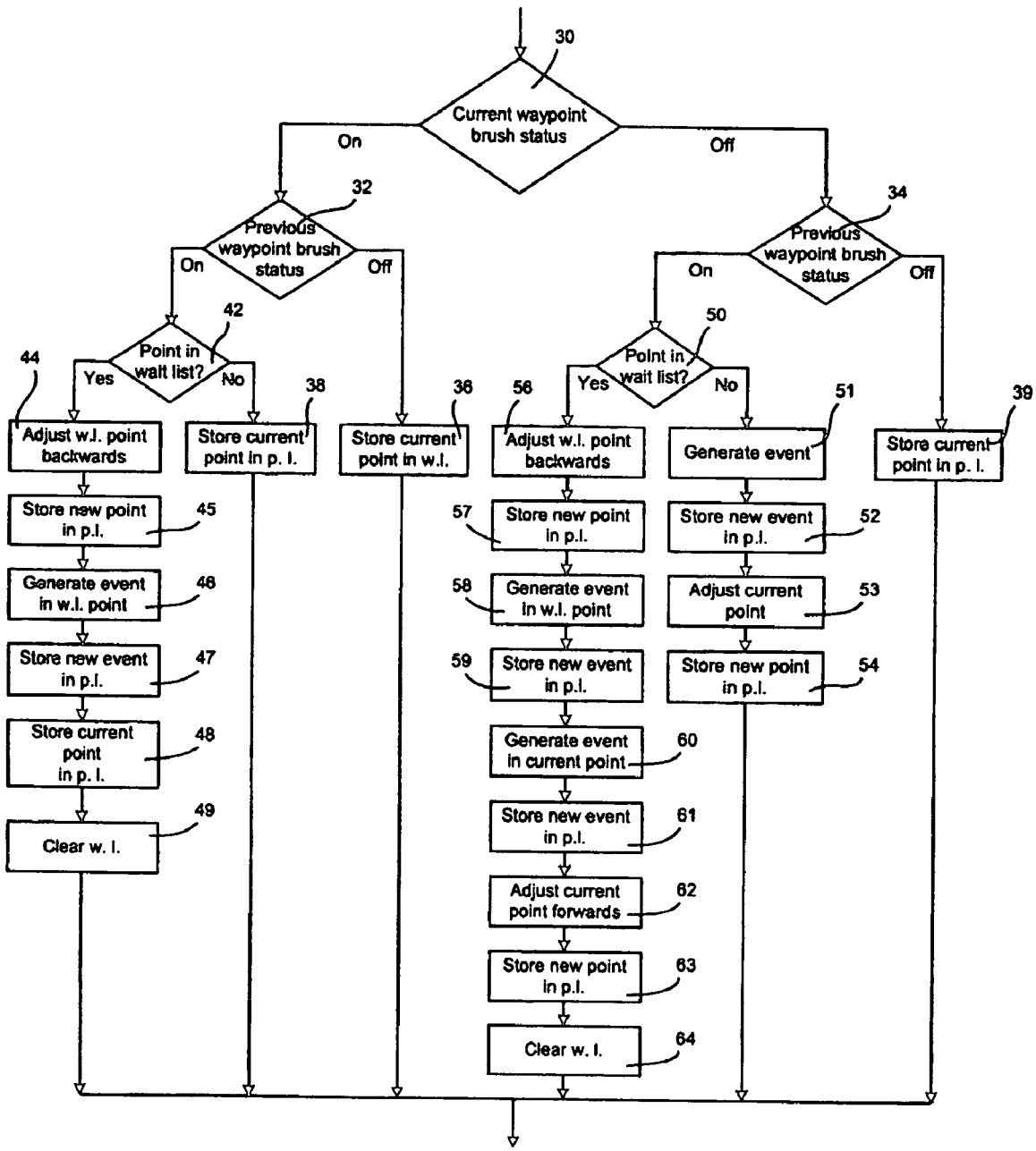

FIGS. 6 and 7 are flow charts illustrating a method and a computer program product according to an embodiment of the present invention. It will be understood that each block of the flow chart can be implemented by computer program instructions. In block 20, configuration data are read into and stored in the system. In block 21, the system waits for new waypoints to be specified. When a new waypoint is specified, position and process information is obtained, block 22. In block 23, it is observed whether the obtained waypoint comprises information about orientation or not. If a waypoint does not contain information about the orientation, the orientation is copied from the last stored waypoint, block 24; otherwise the orientation is obtained from the pointing member, block 25. If necessary, the waypoint is modified, block 26. The modifying of a waypoint is described in more detail in the flow chart shown in FIG. 7. When all the waypoints have been received and, if necessary, modified, robot code is generated based on the configuration data and the modified sequence of waypoint, block 28. In block 29, generated robot code is checked, and if incorrect, it is corrected.

The flow chart in FIG. 7 describes the modification of a waypoint in more detail. To begin with, it is decided whether an obtained waypoint should be modified or not. This decision is based on whether the waypoint comprises a certain process event or not. In the example described herein, only waypoints comprising the process event "turn on paint" or "turn off paint" should be modified. All the other waypoints should be stored as they are received. The determining of whether the waypoint comprises the event "turn on paint" is based on the brush status for the current and the previous waypoint. If the brush status for the current waypoint is "on" and the brush status for the previous waypoint is "off", the waypoint comprises the event "turn on paint", and the waypoint should be modified, block 30, 32. To be able to determine a new position for the waypoint and a new added waypoint, the position of the next waypoint is needed. Until the next waypoint is received, the current waypoint is stored in the wait list, block 36.

If the waypoint does not contain an event, i.e. if the current brush status is "on" and the previous brush status was "on" or if the current brush status is "off" and the previous brush status also was "off", the current waypoint is stored in the path list without any modification, blocks 38, 39. If brush statuses of the current and the previous waypoint are "on" and there is a waypoint waiting in the wait list, blocks 30, 32, 42, the position of the waypoint in the wait list is adjusted backwards along the direction described by the previous and the current waypoint at a distance equal to the point extension distance, block 44. The new waypoint is stored in the path list, block 45. An event "turn on paint" is generated and a new position for the waypoint is determined based on the point extension distance and the previous and the current waypoint positions, block 46. The new event is stored as a waypoint in the path list, block 47. The current waypoint is stored in the path list, block 48. The wait list is cleared, block 49.

If the current waypoint has brush status "off" and the previous waypoint has brush status "on", the waypoint comprises the event "turn off paint" and the point should be modified, blocks 30, 34. If there is no point waiting in the wait list, block 50, the event "turn off paint" is generated and the position of the event is adjusted by adjustment of the position of the current point forwards along a vector determined by the position of the previous waypoint and the current waypoint, a distance equal to the event extension distance, block 51. The new event is stored in the path list, block 52. A new waypoint is added comprising the orientation of the waypoint and a new position achieved by moving the position of the current waypoint forwards along a vector determined by the position of the previous waypoint and the current waypoint, a distance equal to the point extension distance, block 53. The new point is stored in the path list, block 54.

If the brush status of the current waypoint is "off" and brush status of the previous waypoint is "on", and there is a point in the wait list, blocks 30, 34, 50, the point in the wait list is adjusted backwards along a vector determined by the position of the previous and the current waypoints, a distance equal to the point extension distance, block 56. The new point is stored in the path list, block 57. An event "turn on paint" is generated and a new position for the generated event is determined, block 58. The new event is stored in the path list, block 59. An event "turn off paint" is generated and its position is based on the position of the current waypoint, which is moved backwards a distance equal to the event extension distance, block 60. The new event is stored in the path list, block 61. A new waypoint is generated comprising having a new position determined by adjusting the position of the current waypoint forwards along a vector determined by the previous and the current waypoints, a distance equal to the point extension distance, block 62. Store the new waypoint in the path list, block 63. The wait list is cleared in block 64.

After a robot path has been generated, it is possible for the user to edit the robot path. The operator can add new waypoints between consecutive waypoints stored in the system or to the beginning or the end of list of waypoints.

The operator may also edit position, orientation, or process settings of the waypoints and delete waypoints. When the operator wants to delete a waypoint, the following steps need to be performed: go to the selected point in the waypoint list, delete corresponding waypoints from the path list, delete waypoints in the path list corresponding to the previous and the next point in the waypoint list, calculate and generate new waypoints, corresponding to the previous and the next point in the waypoint list, and delete the waypoint from the waypoint list.

When the operator wants to add a new point, the following steps are performed: add the new point to the waypoint list at the indicated position, delete the waypoints in the path list corresponding to the previous point and the next point in the waypoint list, calculate and generate new waypoints corresponding to the previous, the current, and the next waypoints in the waypoint list. When the operator wants to edit a waypoint, the following steps are performed: go to the selected waypoint in the waypoint list, replace point data with edited point data, delete waypoints in the path list corresponding to the previous, the current and the next waypoint in the waypoint list, calculate and generate new waypoints, corresponding to the previous, current and next waypoint in the waypoint list. Thus, it is possible to add, delete, and edit waypoints according to the rules described earlier.

The method according to invention is an off-line programming method, i.e. the method may be used outside the robot and the robot controller.

The present invention is not limited to the embodiments disclosed but may be varied and modified within the scope of the following claims. For example, waypoints can be loaded into the computer from an external system, e.g. a CAD application, or from a database of stored waypoints and process information.

The invention claimed is:

1. A method for programming an industrial robot having a tool, to perform a process on an object while following a robot path defined by a number of waypoints, the method comprising:
   obtaining configuration data including configuration data for the tool, configuration data for the robot path and information about the position and orientation of the object in relation to the robot,
   obtaining a sequence of waypoints, which defines the process in relation to the object, the waypoints comprises information about desired positions of the tool in relation to the object and desired positions of process events in relation to the object,
   obtaining at least one distance for adjusting the position of a waypoint,
   deciding whether an obtained waypoint should be modified or not, based on the obtained information about the waypoints,
   generating a modified sequence of waypoints by modifying the waypoints in the obtained sequence of waypoints, based on said decision, the obtained distance and the obtained information about the waypoints, and
   generating the actual robot path based on the modified sequence of waypoints and the obtained configuration data.

2. The method according to claim 1, wherein obtaining a sequence of waypoints, comprises:
   obtaining information about the position of a pointing member pointing at points on or in the vicinity of the object,
   storing the point being presently pointed out by the pointing member as a waypoint upon receiving a recording signal,
   obtaining information about a process event,
   storing the information about the process event together with the position of the waypoint, and
   determining the position of the points in relation to the object based upon said obtained information.

3. The method according to claim 1, wherein said modifying of a waypoint is made based on a set of predefined rules.

4. The method according to claim 1, wherein said decision comprises
   determining whether a waypoint comprises a specific process event,
   deciding that the waypoint should be modified if the waypoint comprises the specific process event.

5. The method according to claim 4, wherein it is decided to modify a waypoint if the waypoint comprises any of the process events: turn on the process and turn off the process.

6. The method according to claim 4, wherein determining the new position for the waypoint comprises:
   determining a direction based on the position of the current waypoint and the position of the previous waypoint or the position of the current waypoint and the next waypoint, depending on the process event, and
   obtaining the new position by adding the point extension distance to the position of the obtained waypoint in the determined direction.

7. The method according to claim 4, wherein modifying a waypoint comprises: determining a new position for the process event based on said obtained distance and the obtained waypoints, and moving the process event to the new position.

8. The method according to claim 7, wherein said distance for adjusting the position of a waypoint is an event extension distance which depends on a tool speed and a delay time in connection with the process event and the new position for the process event is determined based on said event extension distance.

9. The method according to claim 8, wherein determining the new position for the process event comprises:
   determining a direction based on the position of the current waypoint and the position of the previous waypoint or the position of the current waypoint and the next waypoint, depending on the process event, and
   obtaining the new position by adding the event extension distance to the position of the current waypoint in the determined direction.

10. The method according to claim 1, wherein modifying a waypoint comprises: adding a new waypoint to said sequence of waypoints and determining a position for the new waypoint based on said distance and the obtained waypoints.

11. The method according to claim 10, wherein said obtained distance is a point extension distance which depends on a desired tool speed in the waypoint, and the position for the new waypoint is determined based on said point extension distance.

12. The method according to claim 10, wherein the position for the waypoint is determining based on the position of the current waypoint and the position of the previous waypoint or the next waypoint.

13. The method according to claim 1, wherein said configuration data for the robot path includes the size of an arch between two line segments on the robot path and the configuration data for the tool comprises definition of a tool center point.

14. The method according to claim 1, wherein it generating the robot path comprises generating robot program code based on the waypoints and the configuration data.

15. The method according to claim 1, wherein the waypoints comprises information about the orientation of the tool and the method comprises copying the orientation of the last waypoint to the obtained waypoint upon request.

16. The method according to claim 1, comprising storing the obtained waypoints in a first waypoint list and storing the modified sequence of waypoints in a second waypoint list.

17. Use of the method according to claim 1 for a paint application.

\* \* \* \* \*